(12) United States Patent
Landrum et al.

(10) Patent No.: US 7,591,621 B1
(45) Date of Patent: Sep. 22, 2009

(54) WIND TURBINE BLADE TRANSPORTATION SYSTEM AND METHOD

(75) Inventors: Scott C. Landrum, Southlake, TX (US); T. Christopher King, Keller, TX (US)

(73) Assignee: Transportation Technology Services, Inc., Southlake, TX (US)

( * ) Notice: Subject to any disclaimer, the term of this patent is extended or adjusted under 35 U.S.C. 154(b) by 0 days.

(21) Appl. No.: 12/208,697

(22) Filed: Sep. 11, 2008

(51) Int. Cl.
*B60P 3/40* (2006.01)
*B61D 3/12* (2006.01)

(52) U.S. Cl. .......................................... 410/45; 410/44

(58) Field of Classification Search ................... 410/44, 410/45, 53, 32–35, 49, 120, 156; 105/396, 105/404, 407, 411, 355, 393; 220/1.5
See application file for complete search history.

(56) References Cited

U.S. PATENT DOCUMENTS

| | | | | |
|---|---|---|---|---|
| 3,837,295 | A * | 9/1974 | Fedele | 410/45 |
| 4,150,628 | A * | 4/1979 | Keldenich | 410/45 |
| 4,341,494 | A * | 7/1982 | Fedele | 410/45 |
| 4,365,919 | A * | 12/1982 | Mehki | 410/120 |
| 4,844,672 | A | 7/1989 | Yurgevich | |
| 5,114,288 | A * | 5/1992 | Langendorf et al. | 410/34 |
| 6,286,435 | B1 * | 9/2001 | Kassab et al. | 105/171 |
| 6,422,795 | B2 | 7/2002 | Holt et al. | |
| 7,210,882 | B2 | 5/2007 | Anderson et al. | |
| 7,429,156 | B2 * | 9/2008 | Jensen | 410/45 |
| 2004/0091346 | A1 | 5/2004 | Wobben | |
| 2005/0031431 | A1 * | 2/2005 | Wobben | 410/45 |
| 2006/0285937 | A1 * | 12/2006 | Wobben | 410/45 |
| 2007/0189895 | A1 * | 8/2007 | Kootstra et al. | 416/9 |
| 2007/0248431 | A1 * | 10/2007 | Jensen | 410/45 |
| 2009/0169323 | A1 * | 7/2009 | Livingston | 410/120 |

FOREIGN PATENT DOCUMENTS

SU 1676971 * 9/1991

* cited by examiner

*Primary Examiner*—Patricia L Engle
(74) *Attorney, Agent, or Firm*—Dan Brown Law Office; Daniel R. Brown

(57) ABSTRACT

A system and method for transporting an airfoil, which has a root end, a tip end, and a midsection, over a railroad utilizing a first railcar coupled to a second railcar. The system includes a bracket fixed to the root end of the airfoil and connected to the first railcar, and, the bracket is oriented to align the tip end of the airfoil toward the second railcar. A sliding support is connected to the first railcar at a position between the bracket and the second railcar. The sliding support is adapted to engage the midsection of the airfoil and support the airfoil while enabling the airfoil to move laterally. A lateral guide structure is connected to the second railcar, and aligned to engage the airfoil to limit its lateral movement.

19 Claims, 8 Drawing Sheets

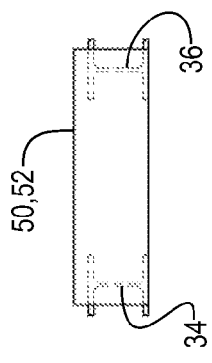
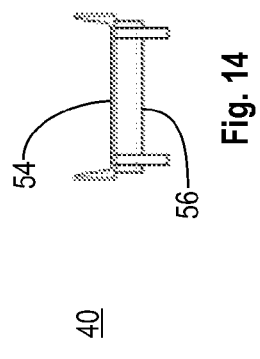
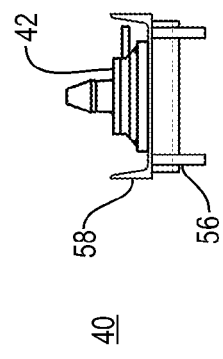
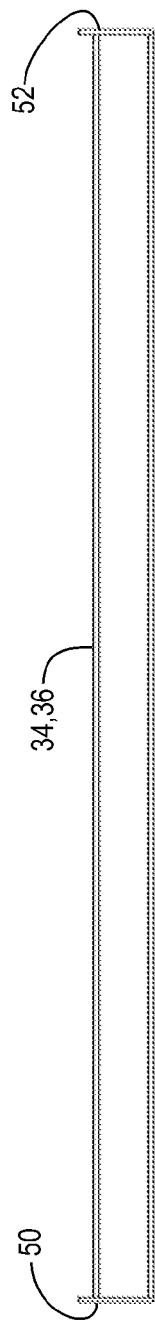
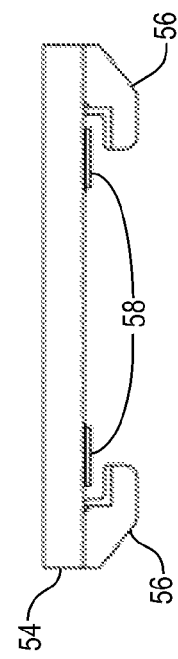
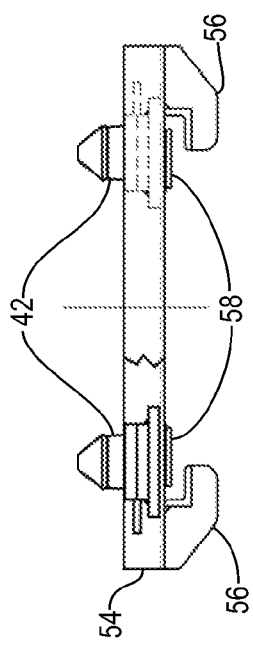

US 7,591,621 B1

WIND TURBINE BLADE TRANSPORTATION SYSTEM AND METHOD

BACKGROUND OF THE INVENTION

1. Field of the Invention

The present invention relates to transporting wind turbine blades. More specifically, the present invention relates to a system and method for transporting long airfoils via railroad using a sliding support assembly and plural railcars.

2. Description of the Related Art

Large-scale wind turbines are used to generate electrical power. Such wind turbines consist of a tall tower with a generator nacelle rotatably coupled about the top of tower's vertical axis. A rotor hub extends out a horizontal axis of the nacelle. Two or more turbine blades are connected to the rotor hub at right angles to the horizontal axis. During operation, prevailing winds cause the turbine blades to rotate about the rotor hub's horizontal axis. The rotational forces are coupled to a generator within the nacelle, which produces electricity. The nacelle rotates about the vertical axis of the tower to maintain the wind turbine blades in proper orientation with the direction of the prevailing winds.

The various components of a large-scale wind turbine may be manufactured at different geographic locations, which may be anywhere in the world. For example, a manufacturer who wishes to assemble a wind turbine generator tower in the United States may have the towers manufactured in Korea, the nacelles manufactured in Denmark and the blades manufactured in Germany. These components must then be then transported to the ultimate power generation site, assembled, erected, and placed into operation. Since the manufacturing operations may be spread across the world, transportation of the components to the generation site may utilize all modes of transportation, including ships, barges, trains and trucks. The various components are expensive to manufacture, and include delicate components that must be protected and handled properly during transportation. The transportation issues are exacerbated in that the components may be transported using plural modes during their journey. For example, a wind turbine blade manufactured in Europe may travel by ship across the ocean, then via railroad to a location in the geographic area of the generation site, and then finally by truck to the ultimate destination.

The evolution of technology and the economies of scale have lead to the development and deployment of large-scale wind turbines with larger and larger proportions. The power generation capacity of a large-scale wind turbine is directly related to the length of the turbine blades, which define the swept area and power capacity of the turbine. The wind loading stresses involved during operation, and the need to keep the total mass of the turbine blades reasonably low, has lead engineers to design and build turbine blades as monocoque structures, typically employing composite materials. The lengths of these structures have grown to over 100 feet in length and at present approach 150 feet in length. Transportation of long turbine blades presents significant challenges to transportation engineers, particularly in the case of railroads, where the railroad profile is tightly limited and the trains must traverse curved sections and complex rail yards. Thus it can be appreciated that there is a need in the art for a system and method addressing the problems related to transportation of long wind turbine blades and other long airfoils via rail.

SUMMARY OF THE INVENTION

The need in the art is addressed by the systems and methods of the present invention. The present invention teaches a system for transporting an airfoil, which has a root end, a tip end, and a midsection, over a railroad utilizing a first railcar coupled to a second railcar. The system includes a bracket fixed to the root end of the airfoil and connected to the first railcar, and, the bracket is oriented to align the tip end of the airfoil toward the second railcar. A sliding support is connected to the first railcar at a position between the bracket and the second railcar. The sliding support is adapted to engage the midsection of the airfoil and support the airfoil while enabling the airfoil to move laterally. A lateral guide structure is connected to the second railcar, and aligned to engage the airfoil to limit its lateral movement.

In a specific embodiment of the foregoing system, the first railcar and the second railcars are flatcars. In another specific embodiment, the bracket is removably connected to first railcar. In a refinement to this embodiment, the bracket is removably connected with a twist lock coupler. In another specific embodiment, the bracket is flexibly connected to the first railcar, which accommodates movement of the airfoil about a vertical axis during transit over the railroad. In particular applications, the midsection of the airfoil is designated as a suitable support section of the airfoil.

In a specific embodiment of the foregoing system, the sliding support further includes a rail fixed to the first railcar along a lateral axis, and a carriage that is slideably engaged with the rail, and the carriage adapted to engage the midsection of the airfoil. In a refinement to this embodiment, the carriage further includes a polymer skid disposed to slideably engage the rail. In another refinement, the carriage further includes a wheel disposed to rotatably engage the rail, thereby enabling the slideable engagement therewith. In another refinement to the system, the carriage further includes a trolley slideably engaged with the rail, and a fixture connected to the trolley that is adapted to support the midsection of the airfoil. The fixture may be removably connected to the trolley, which may be accomplished using a twist lock coupler.

In a specific embodiment of the foregoing system, the lateral guide structure further includes a first guide post connected to the second rail car and oriented to engage a first side of the airfoil, and, a second guide post connected to the second rail car and oriented to engage a second side of the airfoil. In a refinement to this embodiment, the first guide post and the second guide post are padded to protect the surface of the airfoil.

The present invention also teaches a method for transporting an airfoil, which has a root end, a tip end, and a midsection, over a railroad, utilizing a first railcar and a second rail car. The method includes the steps of coupling the first railcar to the second railcar, and, connecting a sliding support to the first railcar, and orienting the sliding support along a lateral axis. Also, fixing a bracket to the root end of the airfoil, and, connecting the bracket to the first rail car, and orienting the airfoil midsection to engage the sliding support, and orienting the tip end of the airfoil toward the second railcar. And, connecting a lateral guide structure to the second railcar, thereby limiting the lateral movement thereof.

In a specific embodiment, the foregoing method further includes the step of removably connecting the bracket to the first railcar. In another specific embodiment, the method includes the step of flexibly connecting the bracket to the first railcar, thereby accommodating movement of the airfoil about a vertical axis during transit over the railroad. In another specific embodiment, the connecting a sliding support step further includes the steps of fixing a rail to the first railcar along a later axis, and slideably engaging a carriage with the rail, and engaging the carriage with the midsection of the airfoil. In another specific embodiment, the foregoing method includes the step of padding the lateral guide structure, thereby protecting the airfoil.

BRIEF DESCRIPTION OF THE DRAWINGS

FIG. 11 and FIG. 12 are detail view drawings of a trolley rail according to an illustrative embodiment of the present invention.

FIGS. 13 and 14 are detail view drawing of trolley traveler according to an illustrative embodiment of the present invention.

FIGS. 15 and 16 are detail view drawing of trolley traveler according to an illustrative embodiment of the present invention.

DESCRIPTION OF THE INVENTION

Figure 1:
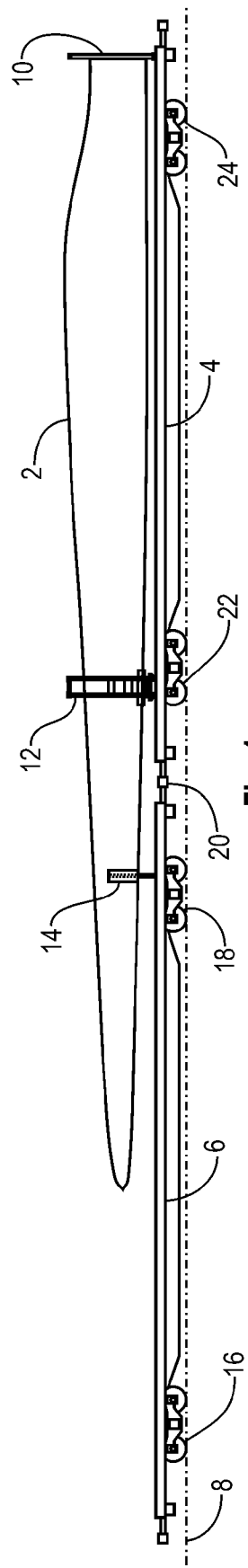
FIG. 1 is an elevation view drawing of an airfoil loaded onto two railcars according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teachings herein address the problems associated with transporting large wind turbine blades and other large airfoils via railroad. The illustrative embodiments presented are principally directed to wind turbine blades, however they are applicable to any large airfoil or similarly structured devices. Such airfoils and devices share the characteristic of a rigid root end that is designed with sufficient strength to support the entire airfoil and accommodate the flexing and stresses involved during operation thereof. Such airfoils are typically tapered through a midsection to a tip end. The section modulus of the airfoil gradually decreases from the root end to the tip end. Generally, the strength profile of the airfoil decreases from the root end to the tip end. In considering the need to support such an airfoil during transportation, it will be appreciated that the airfoil will typically lie in a substantially horizontal orientation, and require two or more support locations. During the transportation of an airfoil, the stresses and bending loads a quite different that those encountered during normal operation. The root end of the airfoil will almost certainly have sufficient strength as a support location during transportation, and the tip end will most likely not have sufficient strength as a support location. Along some region between the root end and the tip end, there will exist sufficient strength to support the airfoil during transportation, and this region will be referred to herein as the midsection. The specific location of the midsection will vary from airfoil to airfoil. In some designs, it may be a narrowly specified portion of the airfoil length that the manufacturer has reinforced to bear transportation loads. In other designs, the midsection may be a broader region between the root end and the tip end.

At present, certain large wind turbine blades having a length of approximately 132 feet are in service, and larger blades having a length of approximately 150 feet are now being deployed. It is expected that wind turbine blades having even longer lengths will be deployed in the future. However, the longest standard rail flatcars that are readily available have a deck length of approximately 89 feet, and a coupler-to-coupler length of approximately 94 feet. This dictates that large airfoils must overhang the length of a railroad flatcar during transportation. Prior loading systems have used two fixed and rigid support locations at either end of a single railcar, one supporting the root end of the wind turbine blade and another supporting the wind turbine blade along its midsection, with the tip of the blade extending beyond one end of the railcar. The railcar supporting the wind turbine blade is referred to as the "load" car. The problem of interference between the blade overhang and an adjacent railcar has been addressed by coupling an "idler" car, which is an empty flatcar, to the end of the railcar carrying the wind turbine blade. Further, two wind turbine blade carrying cars have been coupled to a single idler car, with the tip ends of both wind turbine blades extending over the idler car. In the case of a pair of 132 foot blades and 94 foot flatcars, interference between the two blade tip ends can be avoided because the total length of two blades is less than the length of three flatcars. Another critical factor in employing overhang to address length issues becomes apparent as a train rounds a short radius curve. Main line railroads may have curves as tight as 13 degrees, and some switching yards may have even shorter radius curves, perhaps as tights as 22 degrees. When a train carrying an airfoil rounds such a tight curve, the blade tip end will swing out beyond the width of the railcar and can cross the permissible rail line sectional profile boundary dictated by the railroad, as are known to those skilled in the art. The swing-out effect is highly problematic and greatly limits the railroad routing options available for such loads. As the industry trends toward longer wind turbine blades, the problem is exacerbated.

Figure 2:
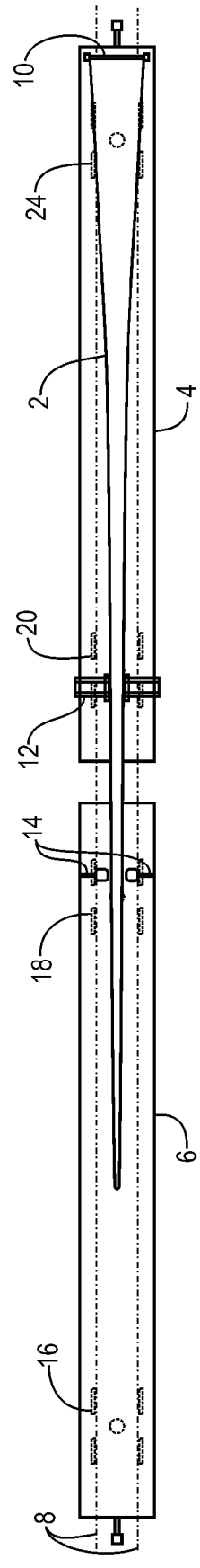
FIG. 2 is a plan view drawing of an airfoil loaded onto two railcars according to an illustrative embodiment of the present invention.

The present invention addresses the problems associated with transporting long airfoils by replacing the prior art midsection fixed and rigid support on the load car with a support that is designed to slide laterally during transit. This enables the midsection of the airfoil to move toward the inside of the turn as the train rounds a curve. Control of this movement is managed by a lateral guide structure that is fixed to the idler car and which engages the airfoil towards the tip end. Thus, the misalignment that naturally occurs as a result of supporting a long object across two coupled railcars while transiting a railroad is accommodated by allowing the midsection of the object to move to the inside of a turn while the tip end is allowed to move to the outside of the turn, but to a lesser degree than in prior art loading systems. Reference is now directed to FIG. 1 and FIG. 2, which are an elevation view drawing and a plan view drawing, respectively, of an airfoil 2 loaded onto two railcars according to an illustrative embodiment of the present invention. The railcars ride along a rail line 8, and are coupled together by conventional means 20, as are known to those skilled in the art. A first railroad flatcar 4, having a first truck 24 and a second truck 22, is fitted with a root end bracket 10 that provides a first support location for a large airfoil 2, which is a 150-foot wind turbine blade in the illustrative embodiment. The first railcar 4 is further fitted with a sliding support structure 12 that supports the vertical loading of the airfoil 2, while allowing the midsection of the airfoil to slide laterally with respect to the longitudinal axis of the first railcar 4. A second railroad flatcar 6, having a first truck 18 and a second truck 16, is fitted with a lateral guide structure 14 that engages the airfoil 2 and limits the degree of lateral movement with respect to the longitudinal axis of the second railcar 6. The lateral support structure 14 does not provide vertical load support of the airfoil 2.

Figure 3:
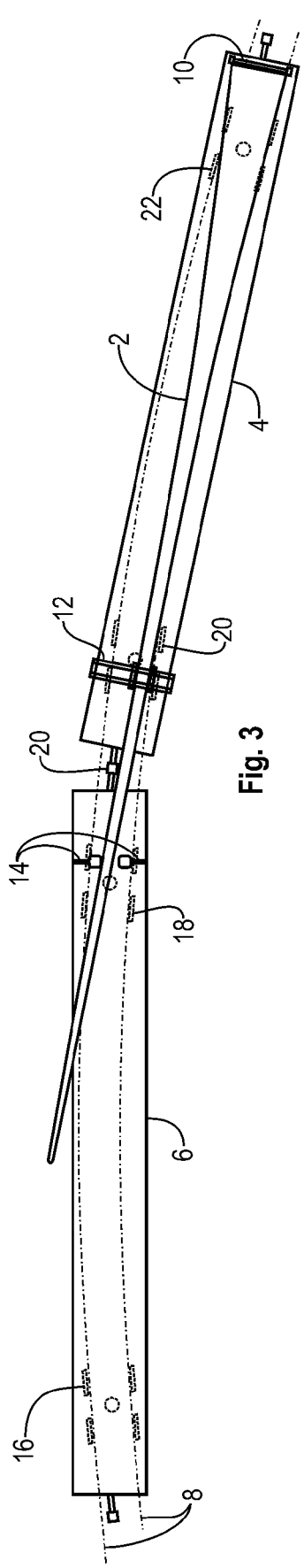
FIG. 3 is a plan view drawing of an airfoil loaded onto two railcars and rounding a curve according to an illustrative embodiment of the present invention.

Reference is directed to FIG. 3, which is a plan view drawing of an airfoil 2 loaded onto two railcars 4, 6 while rounding a curve according to an illustrative embodiment of the present invention. FIG. 3 corresponds to FIG. 1 and FIG. 2. In FIG. 3, the two railcars 4, 6 are rounding a curve in the railroad 8, illustrated as being approximately thirteen degrees of curvature. The airfoil 2 is supported and aligned with the railcars 4,6 by the root end support bracket 10, the sliding support 12, and the lateral guide structure 14. The root end bracket 10 is fixed to the root end of the airfoil 2 and connected to the first end of the first railcar 4 in a manner that enables a small degree of rotation about the vertical axis of the support point 10. This arrangement allows the airfoil 2 to shift in position as the railcars 4,6 round a curve in the tracks 8. The lateral guide structures 14 do not support the weight of the airfoil 2, but limit the degree of lateral movement of the airfoil 2. Thus, as the railcars 4, 6 round a curve, the lateral guide structures 14 prevent excessive swing-out of the tip of the airfoil 2. The weight of the midsection of the airfoil 2 is supported by the sliding support structure 12. As will be more fully described hereinafter, the sliding support 12 consists of a rail that is connected to the railcar and a slideable support carriage that carries the weight of the airfoil 2 midsection while allowing the airfoil to shift laterally during transit. The foregoing figures are directed to an embodiment comprising two 89-foot flatcars and a 150-foot airfoil. The invention is not limited thereto. In the future, longer airfoils may be supported using the teachings of the present invention. Railcars having a longer or shorter length could be substituted. In addition, an articulated spine railcar could also be included as either the load car or the idler care car, or both.

Figure 4:
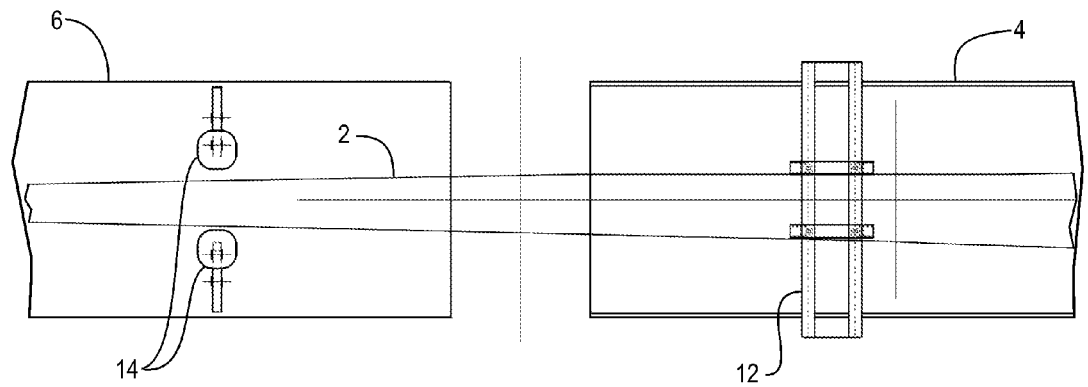
FIG. 4 is a partial plan view of an airfoil loaded on two railcars according to an illustrative embodiment of the present invention.
Figure 5:
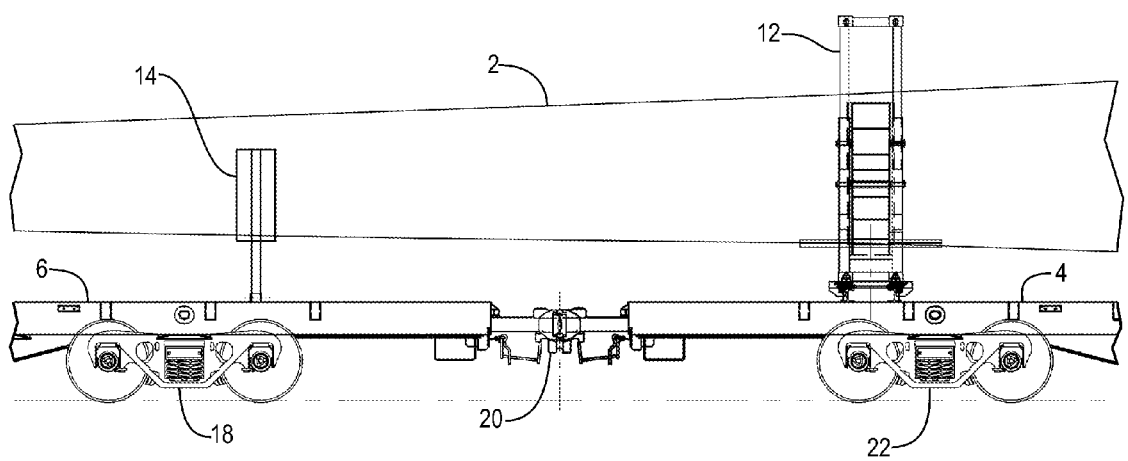
FIG. 5 is a partial elevation view of an airfoil loaded on two railcars according to an illustrative embodiment of the present invention.

Reference is directed to FIG. 4 and FIG. 5, which are a plan view drawing and an elevation view drawing, respectively, of a section of the railcars 4,6 showing the sliding support 12 and lateral support 14 in greater detail than presented in FIGS. 1, 2, 3. In FIG. 4, the railcars 4, 6 are 89-foot flatcars having steel decks that are used as the basis for the load car 4 and the idler car 6 in the system of the present invention. FIG. 5 is the corresponding elevation. The load flatcar 4 consists of a set of trucks 22 supporting the deck of the flatcar 4, which further supports the slider assembly 12 that engages and supports the midsection of the airfoil 2. The idler flatcar 6 consists of a set of trucks 18, and the two cars are coupled 20 in the conventional fashion, as is known to those skilled in the art. The steel deck of the idler flatcar 6 supports the lateral guide structures 14, which engage the sides of the airfoil 2 and limit lateral movement thereof.

Figure 6:
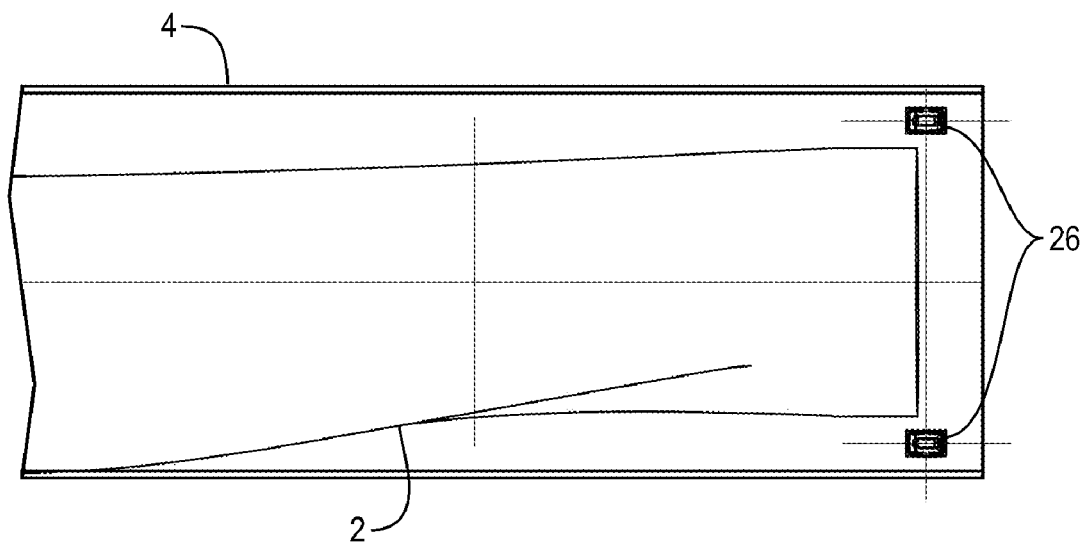
FIG. 6 is a partial plan view of the root end of an airfoil loaded on a rail car according to an illustrative embodiment of the present invention.
Figure 7:
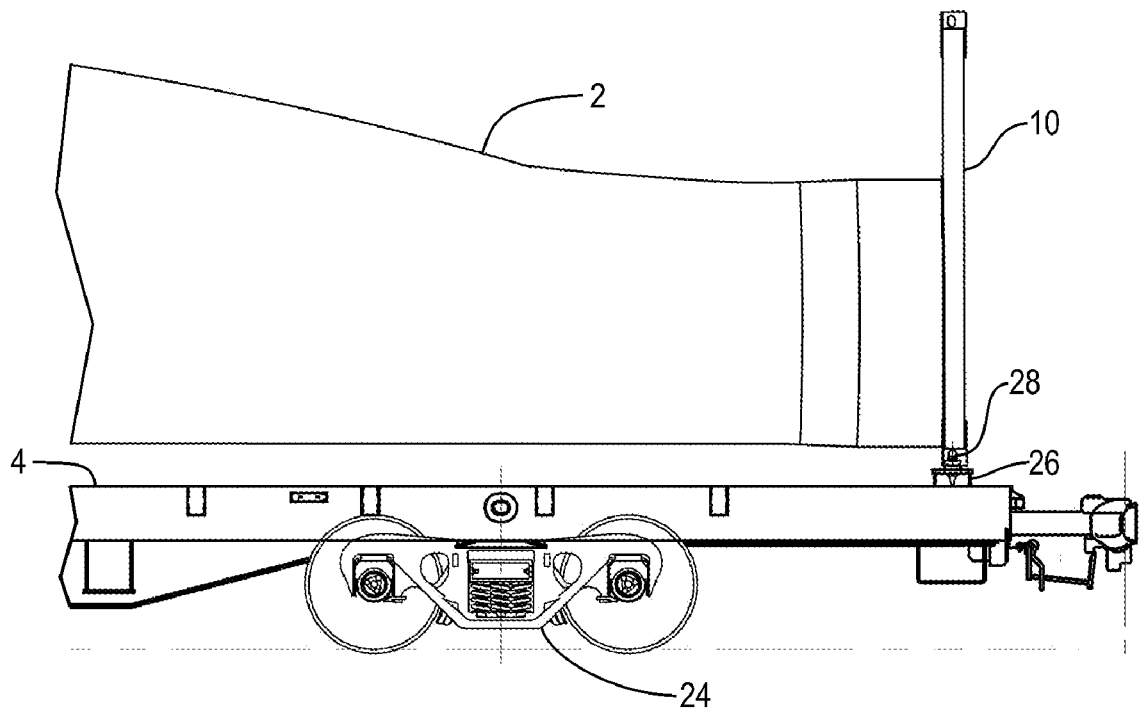
FIG. 7 is a partial elevation view of the root end of an airfoil loaded on a rail car according to an illustrative embodiment of the present invention.

Reference is directed to FIG. 6 and FIG. 7, which are a partial plan view drawing and a partial elevation view drawing, respectively, of a railcar 4 and a root end bracket 10 according to an illustrative embodiment of the present invention. The railcar is an 89-foot flatcar, and FIG. 7 illustrates a convectional truck 24, as are known to those skilled in the art. The airfoil is fixed to the bracket 10, and the bracket is connected to the steel deck of the flatcar 4. In the illustrative embodiment, the root end support bracket 10 is connected to twist lock sockets 26 welded to the deck of the flatcar 4 using a pair of twist lock buffer fixed bases 28, which enable a small degree of flexibility in the connection. Twist lock buffers are known to those skilled in the art of inter-modal shipping and containers. Further information about twist lock buffers and connections is available form Buffers USA, Inc., of Jacksonville, Fla. While twist lock buffers 28 are used in the illustrative embodiment, those skilled in the art will appreciate that other flexible connection techniques could be utilized to provide the desired degree of flexibility, such as bolts with oversized holes, electrometric connections, slotted engagement means and so forth. Also, in certain embodiments where the system designer can rely upon inherent flexibility in the airfoil being transported, the root support bracket 10 may be rigidly connected to the deck of the railcar 4.

Figure 8:
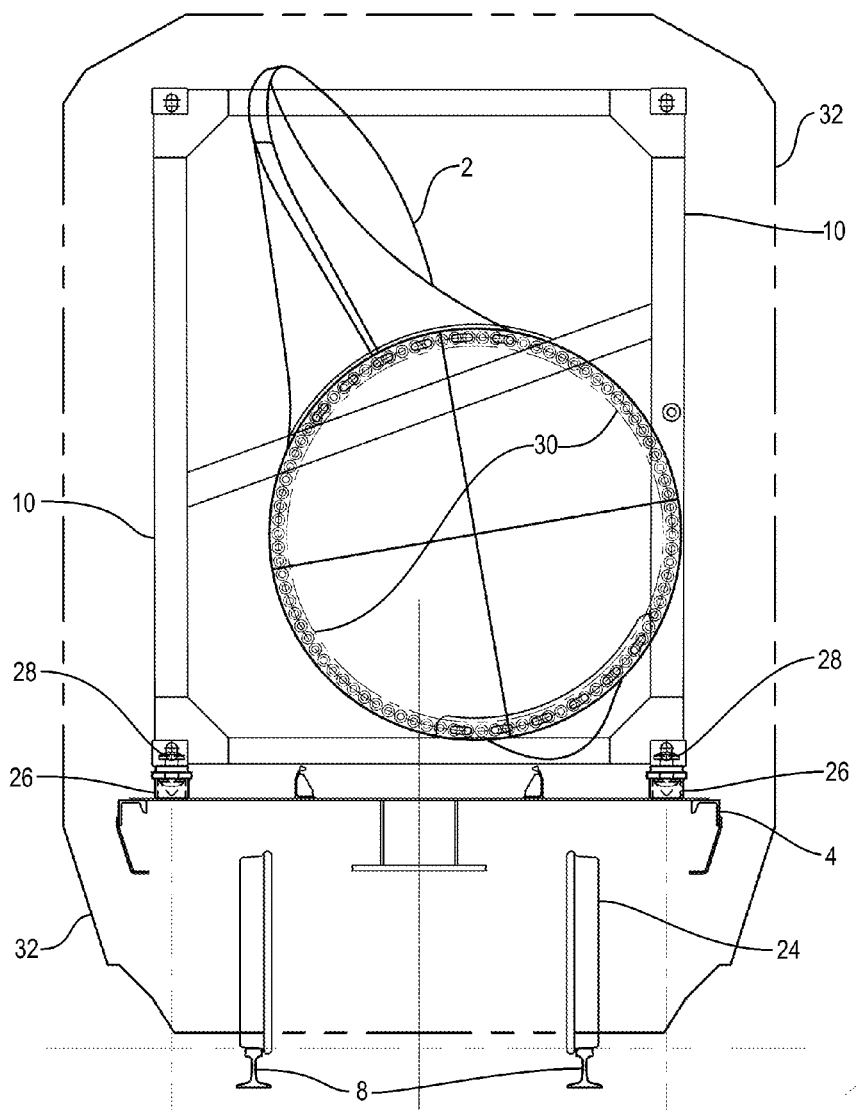
FIG. 8 is a section view drawing of the root end of an airfoil connected to a rail car with a bracket according to an illustrative embodiment of the present invention.
Figure 9:
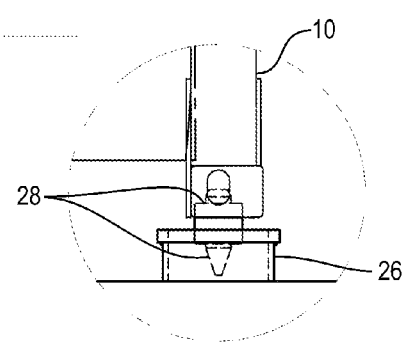
FIG. 9 is a mounting connection according to an illustrative embodiment of the present invention.

Reference is directed to FIG. 8 and FIG. 9, which are a section view drawing and a connection detail drawing, respectively, of the root end support bracket 10 according to an illustrative embodiment of the present invention. The bracket frame 10 is fixedly bolted to the root end flange 30 of the airfoil 2, so as to form a solid unit. The bracket frame 10 includes twist lock sockets at the four corners, which arrangement is know to those skilled in the art of inter-modal shipping systems. A pair of twist lock socket adapters 26 are welded to the steel deck of the rail car 4, and the bracket 10 and sockets 26 are coupled with a pair of twist lock buffers 26. Note that the physical relationship to the entire flatcar 4, including the wheels 24, the rails 8, and the railroad clearance profile 32 are illustrated for clarity.

Figure 10:
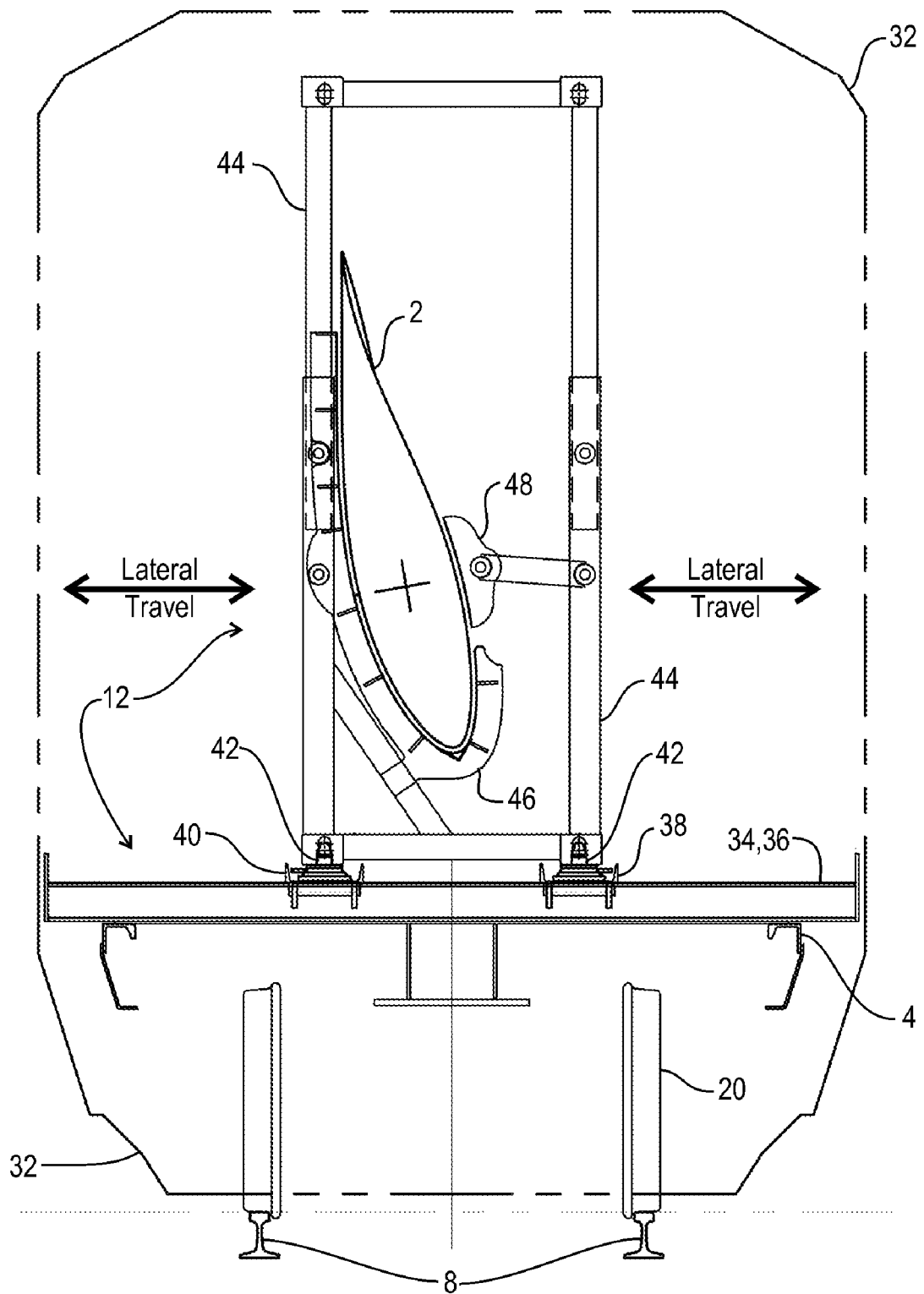
FIG. 10 is a section view drawing of a slidable support assembly supporting an airfoil on a railcar according to an illustrative embodiment of the present invention.

Reference is directed to FIG. 10, which is a section view drawing of a sliding support assembly 12 supporting an airfoil 2 on a rail car 4 according to an illustrative embodiment of the present invention. The railcar 4 is an 89-foot flatcar with wheels 20 riding on rails 8. In addition, the railroad clearance profile 32 is illustrated for reference. In the illustrative embodiment, the sliding support assembly 12 consists of a pair of rails 34, 36 welded to the deck of the rail car 4, and on which a pair of slidably engaged trolleys 38, 40 travel laterally. An airfoil carriage frame 44 is connected to the trolleys 38, 40 using a pair of twist lock buffers 42. The airfoil carriage frame 44 further includes a conformal bracket arrangement with a cradle 46 to support the airfoil 2, and a conformal lock 48 to secure the airfoil in position. In the illustrative embodiment, the sliding support is assembled from light structural steel members, and the conformal portions 46, 48 are padded to protect the surface of the airfoil 2. Those skilled in the art will understand that various other slideable support configurations can be envisioned to both support the airfoil and provided the requisite lateral travel.

Reference is directed to FIG. 11 and FIG. 12, which are detail side view and end view drawings, respectively, of trolley rails 34, 36 according to an illustrative embodiment of the present invention. The rails 34, 36 are fabricated from 25-pound 6-inch wide-flange (6wf25) mild steel beams, held together with mild steel end plates 50, 52, which also serve to retain the trolleys 40 on the rail. The rail assembly is welded to the deck of the host flatcar (not shown).

Reference is directed to FIGS. 13 and 14, which are detail side view and end view drawings, respectively, of a trolley traveler 40 according to an illustrative embodiment of the present invention. Two separate trolley travelers are employed in the illustrative embodiment. The trolley is fabricated from a section of 25-pound 12-inch channel iron (12c25) 54 and a pair of rail fingers 56 that engaged the top flange of the 6wf25 rail. The fingers 56 comprise a short section of angle iron and custom fit gussets that are welded to the bottom of the 12c25 channel. A pair of polymer skids 58 are fastened to the bottom of the 12c25 channel at a location to slideably engage the smooth upper flange of the 6wf25 rails, thereby reducing friction of the desired sliding action. Suitable polymer materials are UHMW polyethylene and nylon, or other suitable polymers that exhibit similar abrasion and wear resistance, as are known to those skilled in the art. FIG. 15 and FIG. 16 generally correspond to FIG. 13 and FIG. 14, however FIG. 15 and FIG. 16 include a pair of twist lock couplers 42 that engage the carriage frame (not shown).

Figure 17:
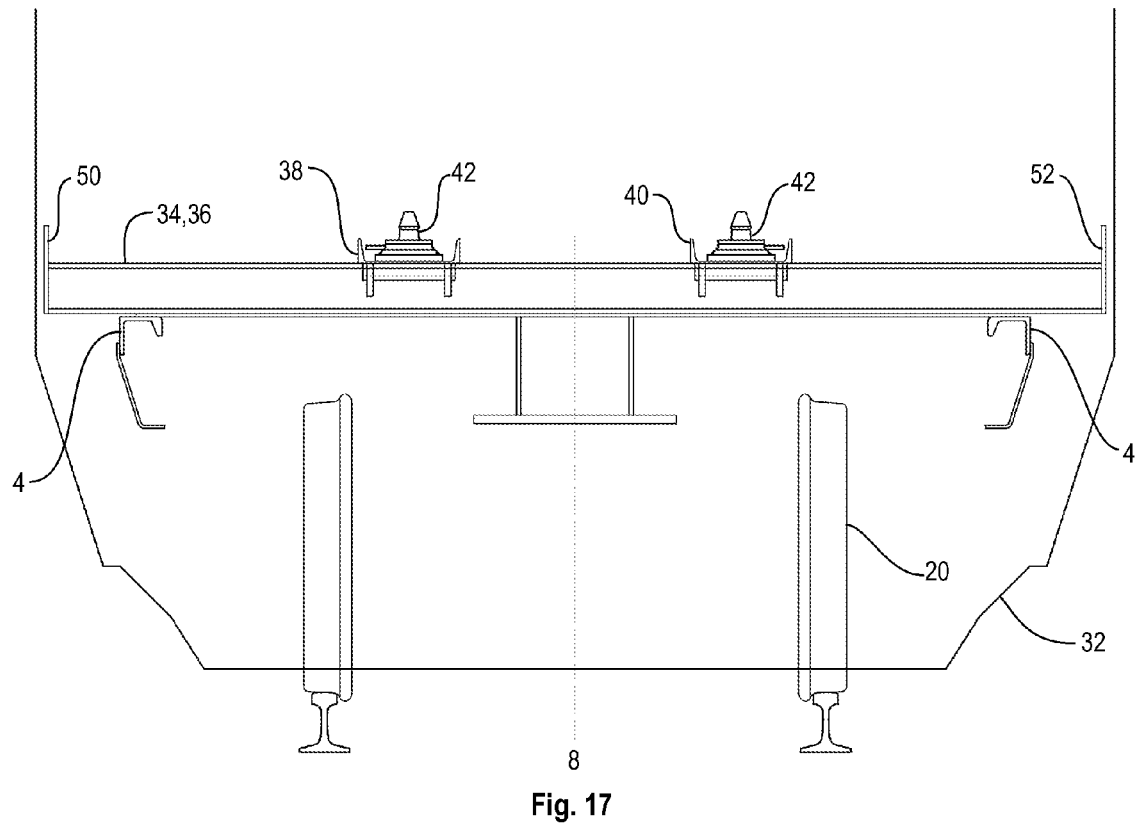
FIG. 17 is a section view drawing of a trolley rail and trolley traveler connected to a railcar according to an illustrative embodiment of the present invention.
Figure 18:
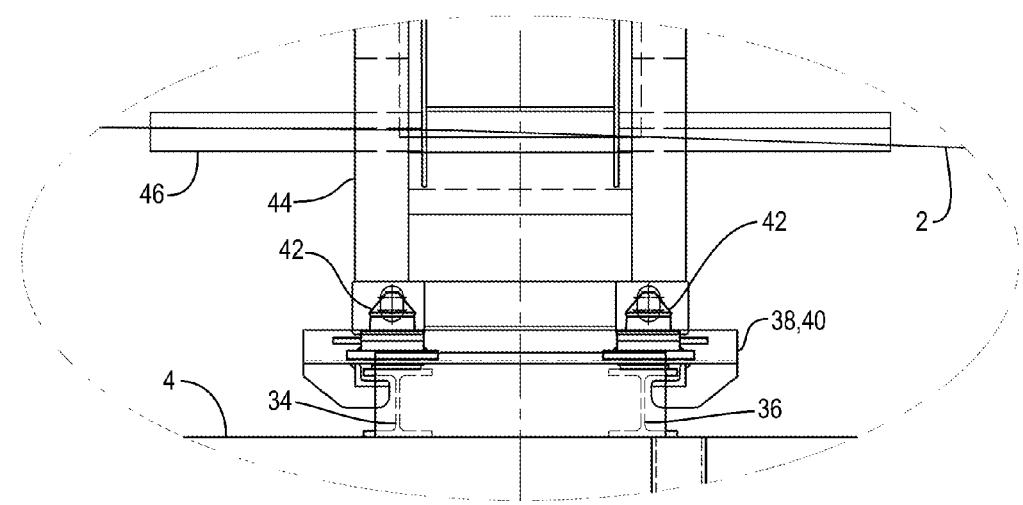
FIG. 18 is a detail view drawing of a slidable support assembly connected to a railcar according to an illustrative embodiment of the present invention.

Reference is directed to FIG. 17 and FIG. 18, which are an end section view and a side view detail, respectively, of the trolley rails 34, 36 and trolley travelers 38, 40 connected to a railcar 4 according to an illustrative embodiment of the present invention. This assembled view corresponds to FIGS. 10 through 16. The rails 34, 36 are welded to the deck of the flatcar 4, which is supported by wheels 20 on railroad tracks 8. The trolley rails 34, 36 are capped with end plates 50, 52 to retain the trolley travelers 38, 40. The length of the trolley rails 34, 36 approach the width of the railroad specified clearance profile 32. Twist lock couplers 42 are welded to the top of the trolley travelers 38, 40 for engaging the carriage frame 44. The conformal support bracket 46 may extend beyond the width of the carriage frame 44, so as to distribute the load from the airfoil to the carriage over a greater surface area.

Figure 19:
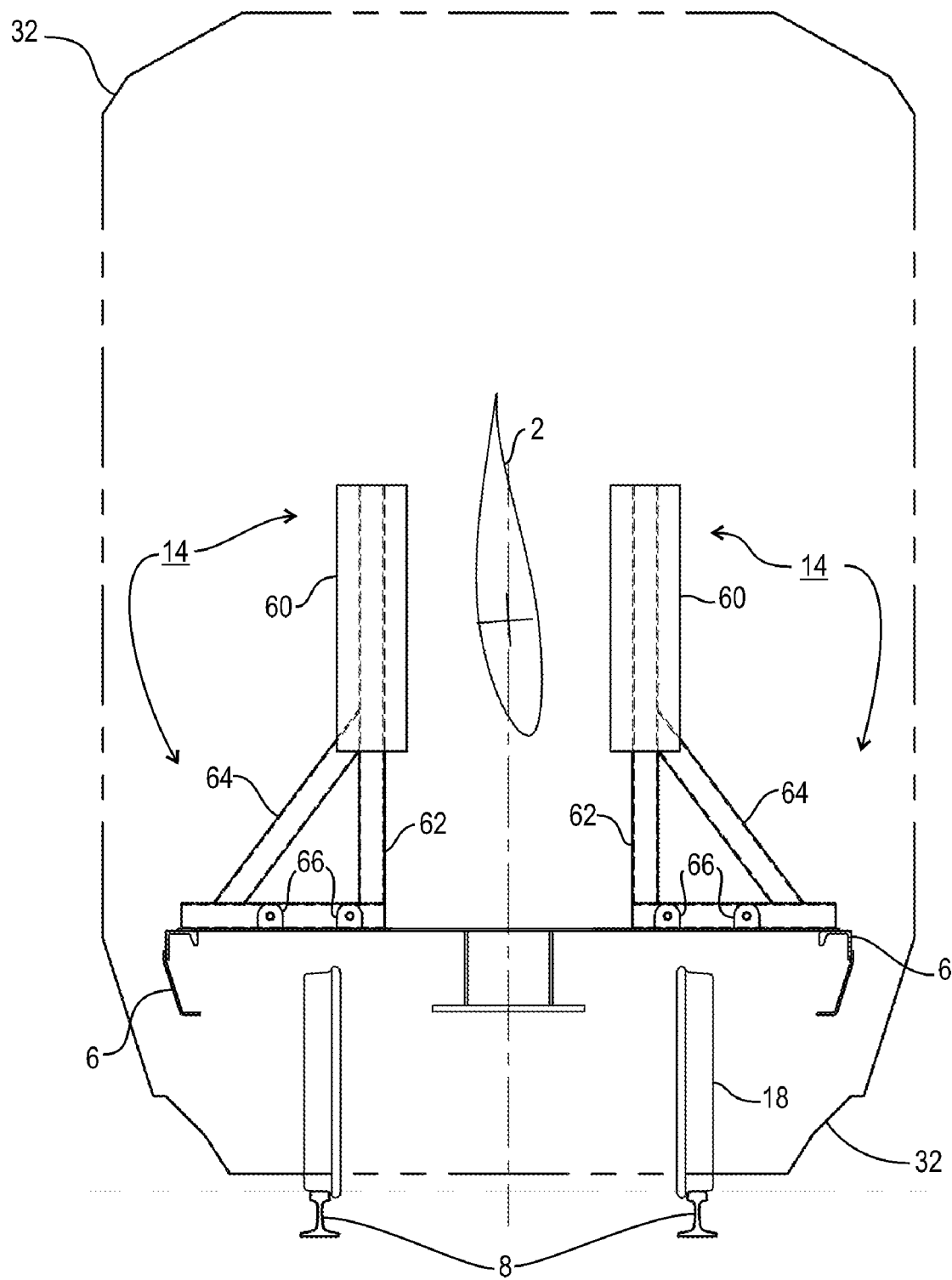
FIG. 19 is a section view drawing of a lateral guide structure connected to a railcar according to an illustrative embodiment of the present invention.

Reference is directed to FIG. 19, which is a section view drawing of a lateral guide structure 14 connected to a railcar 6 according to an illustrative embodiment of the present invention. The railcar 6 is a flatcar with wheels 18 rolling on rails 8. The railroad clearance profile 32 is shown for reference purposes. Plural mounting tabs 66 are welded to the deck of the flatcar 6, and are pinned to the guide frames 64. The guide frames are fabricated as shown from 4-inch square structural tubing having uprights 62 and suitable braces 64 for strength. The upright portions 62 of the guide frame are padded with wrapped closed cell foam 60 to protect the surface of the airfoil 2 as the lateral guide structure is engaged from time to time during transit.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting an airfoil, having a root end, a tip end, and a midsection, over a railroad utilizing a first railcar coupled to a second railcar, the system comprising:
    a bracket fixed to the root end of the airfoil and connected to the first railcar, said bracket oriented to align the tip end of the airfoil toward the second railcar;
    a sliding support connected to the first railcar at a position between said bracket and the second railcar, said sliding support adapted to engage the midsection of the airfoil and support the airfoil while enabling the airfoil to move laterally, and
    a lateral guide structure connected to the second railcar, and aligned to engage the airfoil to limit the lateral movement thereof.

2. The system of claim 1, and wherein said first railcar and said second railcars are flat cars.

3. The system of claim 1, and wherein
    said bracket is removably connected to first railcar.

4. The system of claim 3, and wherein
    said bracket is removably connected with a twist lock coupler.

5. The system of claim 1, and wherein:
    said bracket is flexibly connected to the first railcar, thereby accommodating movement of the airfoil about a vertical axis during transit over the railroad.

6. The system of claim 1, and wherein the midsection of the airfoil is designated as a suitable support section of the airfoil.

7. The system of claim 1, and wherein said sliding support further comprises:
    a rail fixed to the first railcar along a lateral axis, and a carriage slidably engaged with said rail, said carriage adapted to engage the midsection of the airfoil.

8. The system of claim 7, and wherein said carriage further comprises:
a polymer skid disposed to slidably engage said rail.

9. The system of claim 7, and wherein said carriage further comprises:
a wheel disposed to rotatably engage said rail, thereby enabling said slideable engagement therewith.

10. The system of claim 7, and wherein said carriage further comprise:
a trolley slidably engaged with said rail, and
a fixture connected to said trolley and adapted to support the midsection of the airfoil.

11. The system of claim 10, and wherein
said fixture is removably connected to said trolley.

12. The system of claim 11, and wherein
said fixture is removably connected to said trolley using a twist lock couplers.

13. The system of claim 1, and wherein said lateral guide structure further comprises:
a first guide post connected to the second rail car and oriented to engage a first side of the airfoil, and
a second guide post connected to the second rail car and oriented to engage a second side of the airfoil.

14. The system of claim 13, and wherein
said first guide post and said second guide post are padded to protect the surface of the airfoil.

15. A method for transporting an airfoil having a root end, a tip end, and a midsection over a railroad, utilizing a first railcar and a second rail car, the method comprising the steps of:
coupling the first railcar to the second railcar;
connecting a sliding support to the first railcar, and orienting the sliding support along a lateral axis;
fixing a bracket to the root end of the airfoil;
connecting the bracket to the first rail car, and orienting the airfoil midsection to engage the sliding support, and orienting the tip end of the airfoil toward the second railcar, and
connecting a lateral guide structure to the second railcar to engage the tip end of the airfoil, thereby limiting the lateral movement of the tip end of the airfoil.

16. The method of claim 15, further comprising the step of:
removably connecting the bracket to the first railcar.

17. The method of claim 15, further comprising the step of:
flexibly connecting the bracket to the first railcar, thereby accommodating movement of the airfoil about a vertical axis during transit over the railroad.

18. The method of claim 15, wherein said connecting a sliding support step further comprising the steps of:
fixing a rail to the first railcar along a later axis, and
slidably engaging a carriage with the rail, and engaging the carriage with the midsection of the airfoil.

19. The method of claim 15, further comprising the step of:
padding the lateral guide structure, thereby protecting the airfoil.

* * * * *